United States Patent
Gribble et al.

[11] Patent Number: 6,136,191
[45] Date of Patent: Oct. 24, 2000

[54] ELEVATING SOLIDS SEPARATOR AND DRIVE CONNECTION THEREFOR

[76] Inventors: Donald L. Gribble; Ted A. Gribble, both of 32854 S. Dryland Rd., Molalla, Oreg. 97038

[21] Appl. No.: 09/166,624

[22] Filed: Oct. 5, 1998

[51] Int. Cl.[7] .................................................. B01D 33/04
[52] U.S. Cl. ......................... 210/400; 210/523; 210/526; 209/272; 198/690.2; 198/834
[58] Field of Search ................................. 210/170, 400, 210/513, 523, 526, 531; 209/272, 301, 308, 470; 198/834, 690.2

[56] References Cited

U.S. PATENT DOCUMENTS

| | | |
|---|---|---|
| 1,067,980 | 7/1913 | Halterman . |
| 1,407,919 | 2/1922 | Berry . |
| 1,459,854 | 6/1923 | Nelson . |
| 1,893,938 | 1/1933 | Ghent . |
| 1,953,317 | 4/1934 | Stoltenberg . |
| 2,639,025 | 5/1953 | Schmitt . |
| 3,102,857 | 9/1963 | Dauenhauer . |
| 4,143,759 | 3/1979 | Paradis . |
| 4,372,440 | 2/1983 | Ringis . |
| 4,666,602 | 5/1987 | Hartzell . |
| 5,059,313 | 10/1991 | Etschel et al. . |
| 5,333,723 | 8/1994 | Rich . |

*Primary Examiner*—W. L. Walker
*Assistant Examiner*—David Sorkin
*Attorney, Agent, or Firm*—Kolisch, Hartwell, Dickinson, McCormack & Heuser

[57] ABSTRACT

Disclosed is a separator that extracts solids from a manure slurry. The separator includes a powered rotating drive cylinder, a plurality of fins radially extending from the drive cylinder, and a flexible conveyor belt driven by the drive cylinder. The conveyor belt has a plurality of grooves positioned so that at least one of the fins contacts a substantial portion of one of the grooves as the drive cylinder drives the flexible conveyor belt.

12 Claims, 3 Drawing Sheets

ELEVATING SOLIDS SEPARATOR AND DRIVE CONNECTION THEREFOR

FIELD OF THE INVENTION

The present invention relates to solids extraction from a solid/liquid slurry, and more particularly, to a slip-reducing drive connection for a conveyor belt used in such an extraction operation.

BACKGROUND AND SUMMARY OF THE INVENTION

Manure produced at a feedlot or dairy barn must be regularly removed to ensure adequate sanitation and to prevent disease. One manure removal method is to flood the feedlot or barn floor with water to create a solid/liquid slurry. The slurry is directed through pipes or channels to a man-made slurry pond, where the solids and particulates settle to the bottom of the pond. The liquid is drained and recycled and the solids are removed and used as fertilizer.

One problem with a slurry pond is that a high proportion of solids in the slurry may clog or otherwise impede the slurry as it passes through the channels or pipes. Another problem is that it is time-consuming and difficult to remove the significant amount of solids once they settle to the bottom of the ponds. In addition, the large amounts of methane produced by the decomposing manure create a potentially dangerous working environment. The monitoring and removal of solids from the bottom of the ponds forces workers to work for extended periods in this hazardous environment.

To solve these problems, machines have been developed that remove a significant proportion of the solids in the slurry prior to placing the slurry in a pond. One such machine includes a friction-driven conveyor belt that lifts solids from the slurry, drains liquid in the slurry as it is carried along the conveyor, and deposits the resulting solids in a pile. The drained liquid is routed to the slurry pond and contains significantly fewer solids than the original slurry, and is therefore much easier and safer to process. This type of machine is inexpensive to build and maintain and is preferred in many situations because of its simplicity. However, the flexible conveyor belt is prone to slip on the drive drum driving the conveyor when large amounts of solids are being lifted and carried along the belt. Slipping is even more likely when slurry gets caught between the conveyor and the drive drum. The slipping belt prevents the conveyor from moving the solids. In addition, the rotating drive drum rubs against the slipping belt, which wears down the belt and contributes to early belt failure. Furthermore, the power source driving the drive drum, typically an electric motor, may become damaged during continuous slipping.

The present invention overcomes these problems by providing a separator that extracts solids from a solid/liquid mixture, comprising: a flexible belt having a plurality of linear grooves, and a powered drive cylinder including a fin positioned to contact a substantial portion of one of the plurality of grooves.

Another aspect of the invention provides a separator that extracts solids from a manure slurry. The separator includes a powered rotating drive cylinder, a plurality of fins extending radially from the drive cylinder, and a flexible conveyor belt driven by the drive cylinder. The conveyor belt has a plurality of grooves positioned so that at least one of the fins contacts a substantial portion of one of the grooves as the drive cylinder drives the flexible conveyor belt.

Another aspect of the invention provides an endless carrier including a plurality of linear grooves and a plurality of approximately radially oriented fins. At least one of the fins fits in at least one of the plurality of grooves to thereby transmit motive power to the endless carrier.

Still another aspect of the present invention provides a conveyor mechanism comprising a conveyor belt and a plurality of substantially radially extending linear fins that engage a part of the conveyor belt along a substantial line of contact to thereby drive the conveyor.

Yet another aspect of the present invention provides a conveyor that removes solids from a solid/liquid mixture. The conveyor includes a belt having a plurality of linear grooves on one side. A plurality of driven radial fins are disposed so that at least one of the fins contacts at least one of the plurality of grooves to drive the belt.

The advantages of the present invention will be understood more readily after a consideration of the drawings and the Detailed Description of the Preferred Embodiment.

DETAILED DESCRIPTION OF THE DRAWINGS

Figure 1:
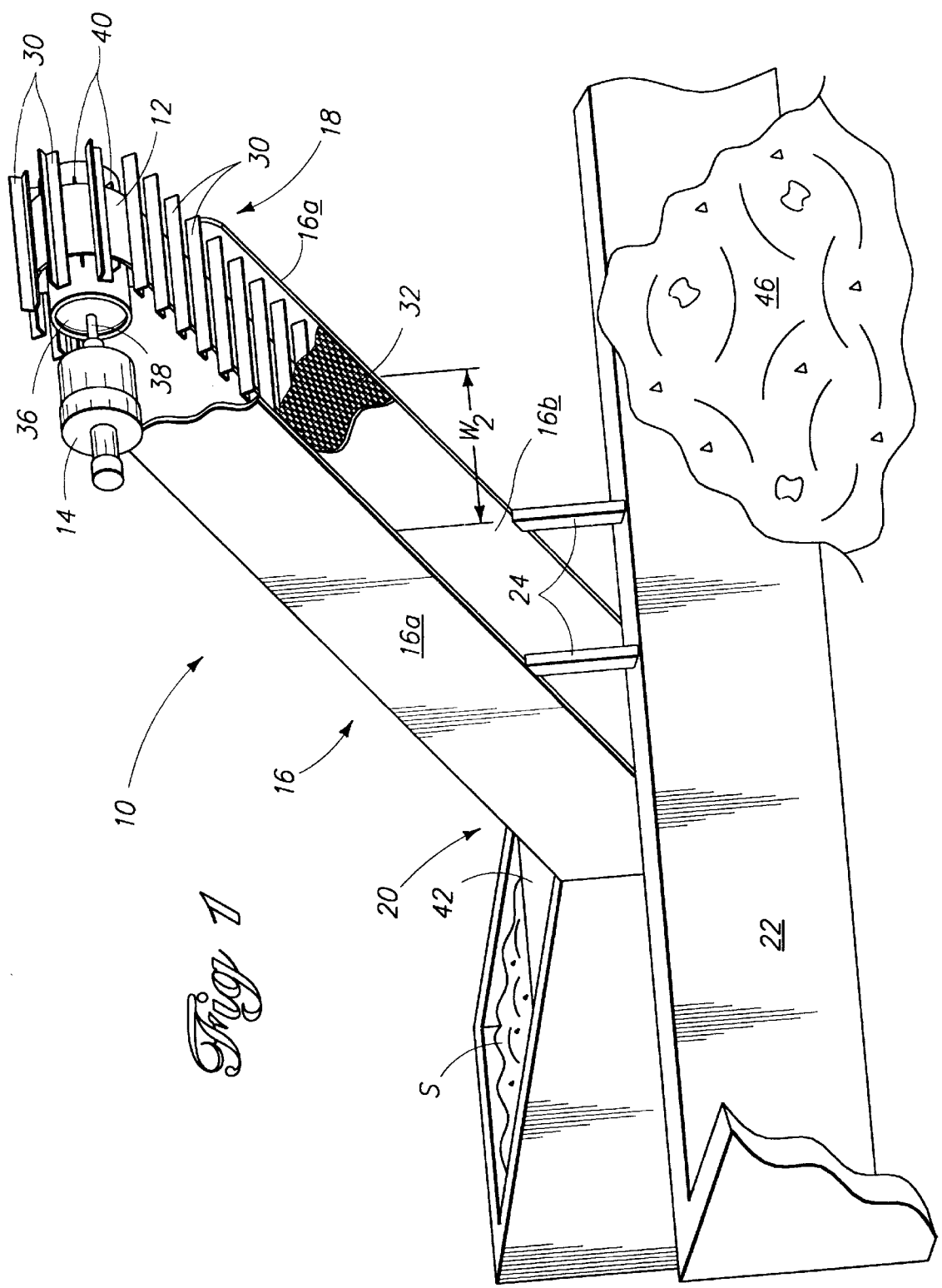
FIG. 1 is a perspective view of a solid/liquid separator of the present invention, with part of the separator cut away.
Figure 2:
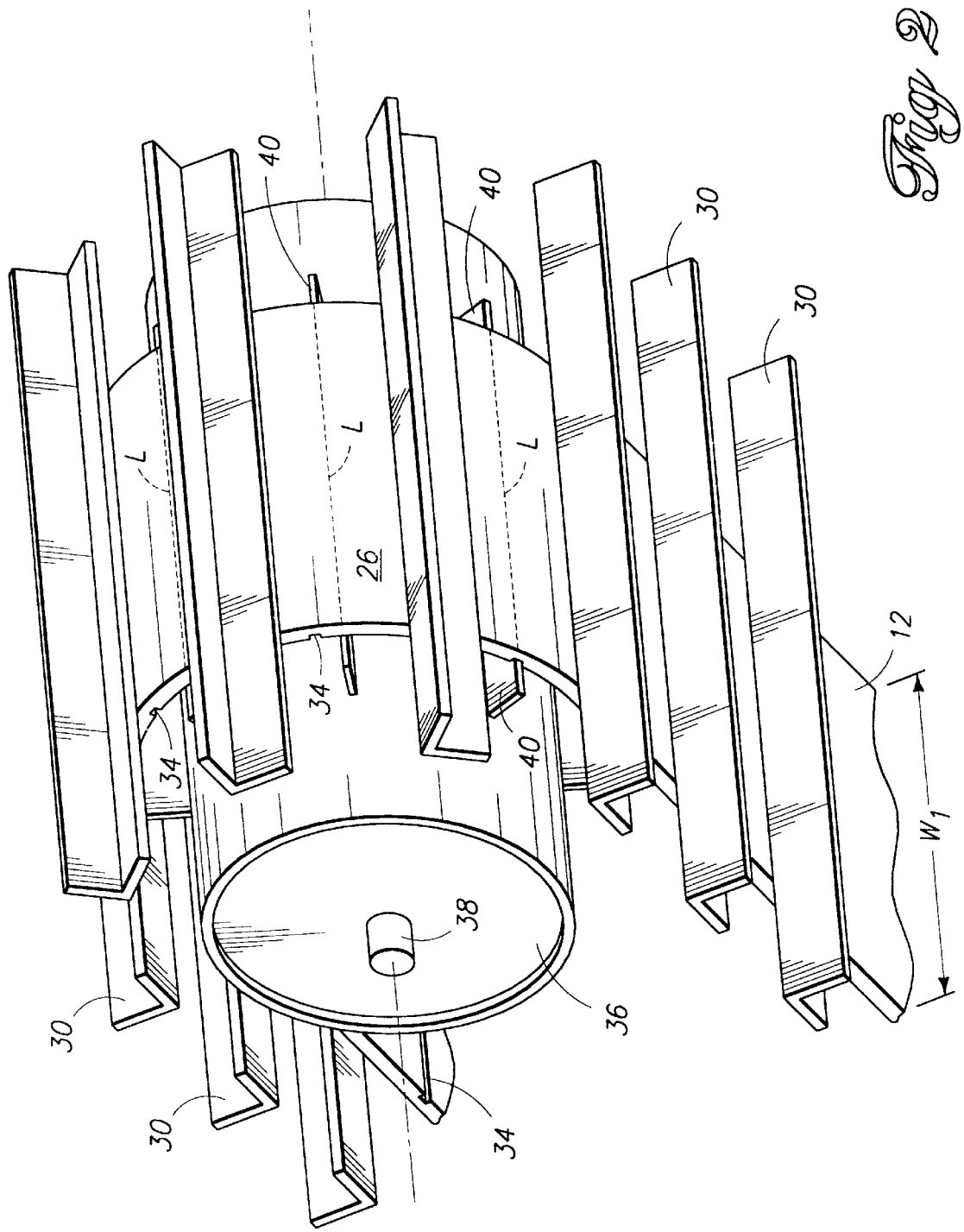
FIG. 2 is a detail view of part of the separator shown in FIG. 1.
Figure 3:
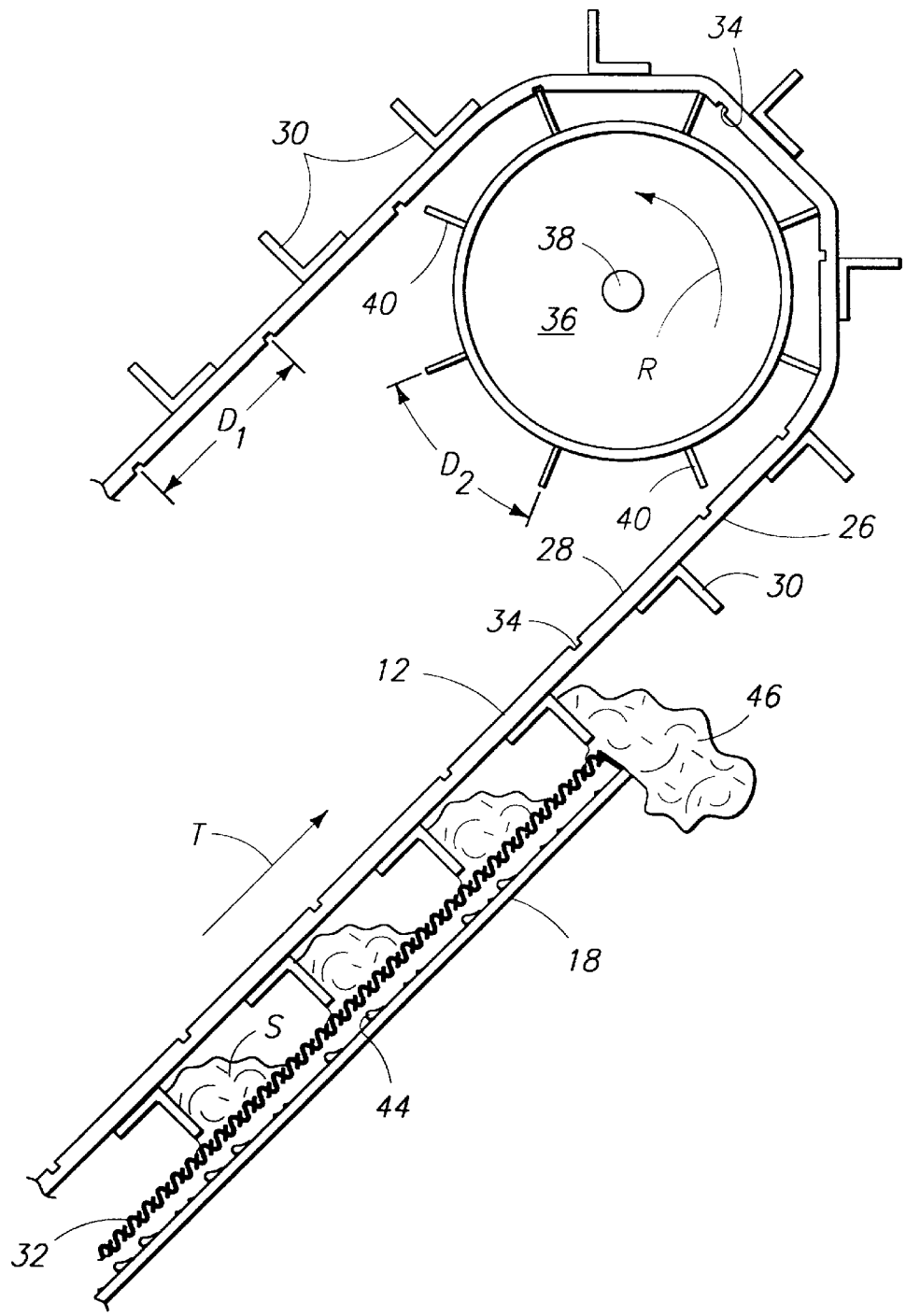
FIG. 3 is a side elevational view of part of the separator of the present invention.

FIGS. 1–3 show the solids separator 10 of the present invention, which includes a flexible conveyor belt 12 driven by an electric motor 14. Conveyor belt 12 is contained within a housing 16 that includes side walls 16a and a bottom 16b. A first end 18 of housing 16 is elevated with respect to a second end 20 of housing 16. This may be accomplished by supporting housing 16 on a retaining wall 22 via supports 24. Electric motor 14 is mounted on first end 18. Conveyor belt 12 has an outer surface 26 and an inner surface 28 and is depicted as having a width $W_1$ that is less than the width $W_2$ of housing 16. A plurality of substantially parallel paddles 30 are attached to outer surface 26 of conveyor belt 12. Each paddle 30 extends between side walls 16a. A separating screen 32 is interposed between paddles 30 and bottom 16b.

Inner surface 28 of conveyor belt 12 has a plurality of linear grooves 34. As shown in the Figures, grooves 34 are preferably cut from the conveyor belt material along the width $W_1$ of conveyor belt 12. Grooves 34 are formed a linear distance $D_1$ from each other.

Electric motor 14 rotates a drive drum 36 through a shaft 38. A plurality of linear fins 40 radially extend from drive drum 36 and contact inner surface 28 of conveyor belt 12 along substantial lines of contact L. Fins 40 preferably have a length at least as long as the length of grooves 34. Fins 40 are circumferentially spaced around drive drum 36 by a distance $D_2$, which may be slightly greater or slightly less than linear distance $D_1$. The depicted embodiment uses eight fins, but more or fewer fins 40 may be used as required.

In operation, unprocessed slurry S enters separator 10 at an inlet 42. Electric motor 14 rotates drive drum 36 in direction R, and fins 40 contact inner surface 28 of conveyor belt 12 along lines of substantial contact L.

Conveyor belt 12 moves in a direction T about drive drum 36 and an idler drum (not shown), which is located proximal second end 20. Paddles 30 lift and carry portions of slurry S above screen 32, which allows liquid 44 within slurry S to drain through the screen. Liquid 44 is then directed through channels or pipes (not shown) to a slurry pond (not shown). The remaining solids 46 continue to be carried by paddles 30 to first end 18, where they drop out of separator 10 to await further handling.

Conveyor belt 12 is fitted around drive drum 36 and the idler drum (not shown) with enough tension to prevent slipping therebetween. If slipping occurs, however, fins 40 may slide along inner surface 28 until one of fins 40 fits into one of grooves 34, thereby creating a positive drive connection between the conveyor belt and the drive drum. Because distances $D_1$ and $D_2$ are unequal, only one fin will be disposed within a groove at any given time. The remainder of the fins will merely contact inner surface 28. Conveyor belt 12 will thereby be driven by drive drum 36 without slipping at least until the fin within a groove is separated from that groove. If slipping again occurs, drive drum 36 will only slip until one of fins 40 fits into one of grooves 34. Thus, the fin/groove connection eliminates continuous slipping between the drive drum and the conveyor belt.

As seen in FIG. 3, conveyor belt 12 may be sufficiently flexible to be stretched straight between adjacent fins 40. As grooves 34 are preferably formed from the conveyor belt material, the grooves disposed between adjacent fins 40 will also be stretched. Any slurry solids trapped within grooves 34 will be thereby loosened from the grooves. The stretching of the conveyor belt between adjacent fins helps prevent slurry buildup within the grooves.

One advantage of the present invention is that the elimination of continuous slipping prevents electric motor 14 from becoming damaged.

Another advantage is that the tension of conveyor belt 12 may be reduced. Normally the tension on a friction-driven conveyor belt must be quite high to prevent slipping. However, in the present invention conveyor belt 12 may be driven by the positive drive connection between fins 40 and grooves 34. The tension on conveyor belt 12 can therefore be set much lower than with a purely friction-driven conveyor. The reduced tension greatly reduces the wear on the bearings in the drive drum, idler drum, and the electric motor.

While the invention has been disclosed in its preferred form, the specific embodiments thereof as disclosed and illustrated herein are not to be considered in a limiting sense as numerous variations are possible. Applicants regard the subject matter of their invention to include all novel and non-obvious combinations and subcombinations of the various elements, features, functions and/or properties disclosed herein. No single feature, function, element or property of the disclosed embodiments is essential. The following claims define certain combinations and subcombinations which are regarded as novel and non-obvious. Other combinations and subcombinations of features, functions, elements and/or properties may be claimed through amendment of the present claims or through presentation of new claims in this or a related application. Such claims, whether they are broader, narrower or equal in scope to the original claims, are also regarded as included within the subject matter of applicants' invention.

What is claimed is:

1. A separator that extracts solids from a solid/liquid mixture, comprising:
    a flexible belt having a plurality of linear grooves cut into a surface of the belt; and
    a powered drive cylinder including a first fin,
    wherein the drive cylinder is adapted to drive the flexible belt in a first operational state wherein the first fin contacts the belt but does not contact the grooves and in a second operational state that is independent of the first operational state wherein the first fin contacts a substantial portion of one of the plurality of grooves.

2. A separator that extracts solids from a manure slurry, comprising:
    a powered rotating drive cylinder;
    a pair of fins radially extending from the drive cylinder and spaced a first distance from each other; and
    a flexible conveyor belt driven by the drive cylinder, the flexible conveyor belt having a plurality of grooves cut into a surface of the belt that are spaced from each other a second distance that is different from the first distance, wherein at least one of the grooves is at least intermittently engaged by one of the fins.

3. The separator of claim 2, wherein each of the plurality of grooves has a length, and the flexible conveyor belt has a width; and further wherein the length of each of the plurality of grooves is substantially equal to the width of the conveyor belt.

4. The separator of claim 2, wherein the grooves are disposed on a first side of the conveyor belt, and further comprising a plurality of paddles attached to a second side of the conveyor belt.

5. An endless carrier including a plurality of linear grooves cut into a surface of the carrier, and a plurality of approximately radially oriented fins, wherein motive power is transmitted to the endless carrier in a first operational state wherein the fins contact the endless carrier but do not contact any of the grooves and in a second operational state that is independent of the first operational state wherein one of the fins contacts one of the grooves.

6. A conveyor that removes solids from a solid/liquid mixture, the conveyor including a belt having a plurality of linear grooves cut into a surface of the belt and a plurality of radial fins, wherein the belt is driven in a first operational state wherein the fins contact the belt but do not contact any of the grooves and in a second operational state that is independent of the first operational state wherein one of the fins contacts one of the grooves.

7. The separator of claim 1, wherein:
    the grooves are separated from each other by a first distance,
    the separator further comprising:
    a second fm disposed on the cylinder and configured to contact and drive the flexible belt, wherein the first and second fins are spaced apart a second distance that is not equal to the first distance.

8. The separator of claim 2, wherein the flexible conveyor belt is driven by the powered drive cylinder in a first operational state wherein the fins contact the belt but do not contact any of the grooves, and in a second operational state that is independent of the first operational state wherein one of the fins contacts one of the grooves.

9. The conveyor of claim 6, wherein the grooves are spaced a first distance from each other and the fins are spaced a second distance from each other, and wherein the first distance is not equal to the second distance.

10. A conveyor mechanism, comprising:
    a conveyor belt having a plurality of linear grooves cut into a surface of the belt; and
    a drive cylinder including an outer surface and a plurality of fins radially extending from the outer surface, the fins being adapted to engage and drive the conveyor belt, wherein the fins and conveyor belt are adapted such that when the fins engage the conveyor belt, the conveyor belt is supported by the fins and does not contact the outer surface of the drive cylinder, and at least one of the grooves is at least intermittently engaged by one of the fins.

11. A conveyor mechanism, comprising:

a conveyor belt having a plurality of linear grooves cut into a surface of the belt; and a drive cylinder including:
   an outer surface having a circumference; and
   a plurality of fins radially extending from the outer surface and circumferentially spaced around the drive cylinder so that each fin is spaced from an adjacent one of the fins by at least one twelfth of the circumference of the outer surface of the drive cylinder;

wherein at least one of the grooves is at least intermittently engaged by one of the fins.

12. A conveyor mechanism, comprising:

a conveyor belt having a plurality of linear grooves cut into a surface of the belt; and a drive cylinder having a plurality of fins radially extending from the drive cylinder, the fins being adapted to engage and drive the conveyor belt, wherein the conveyor belt is adapted so that the grooves are stretched when the conveyor belt is engaged by the fins in order to dislodge solids trapped within the grooves.

* * * * *